(12) United States Patent
Munn

(10) Patent No.: US 12,537,728 B2
(45) Date of Patent: Jan. 27, 2026

(54) SYSTEM AND METHOD FOR SENDING AND RECEIVING AN ETHERNET FRAME

(71) Applicant: CARRIER CORPORATION, Palm Beach Gardens, FL (US)

(72) Inventor: Donald J. Munn, Cortez, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 245 days.

(21) Appl. No.: 17/763,425

(22) PCT Filed: Sep. 23, 2020

(86) PCT No.: PCT/US2020/052155
§ 371 (c)(1),
(2) Date: Mar. 24, 2022

(87) PCT Pub. No.: WO2021/061728
PCT Pub. Date: Apr. 1, 2021

(65) Prior Publication Data
US 2022/0345339 A1    Oct. 27, 2022

Related U.S. Application Data

(60) Provisional application No. 62/905,030, filed on Sep. 24, 2019.

(51) Int. Cl.
*H04L 25/493* (2006.01)
*H04L 1/00* (2006.01)
(Continued)

(52) U.S. Cl.
CPC .......... *H04L 25/493* (2013.01); *H04L 1/0056* (2013.01); *H04L 25/4904* (2013.01); *H04L 67/12* (2013.01); *G08B 17/00* (2013.01)

(58) Field of Classification Search
CPC ... G08B 17/00; H04L 1/0056; H04L 25/4904; H04L 25/493; H04L 67/12
See application file for complete search history.

(56) References Cited

U.S. PATENT DOCUMENTS

| 4,573,044 A | 2/1986 | McConachie et al. |
| 5,164,960 A | 11/1992 | Wincn et al. |

(Continued)

FOREIGN PATENT DOCUMENTS

| DE | 102010040772 | 3/2012 |
| EP | 0700602 B1 | 6/2005 |

(Continued)

OTHER PUBLICATIONS

"2×2,5-LH-500—Halogen Free Twisted & Shielded Fire Cable with 2 wires 2.5 mm2—Morley-IAS—Honeywell", Ornicom.com, online <https://www.ornicom.com/products/wiring/twisted-shielded-fire-cable-2-wires-2-5-mm2.html>, printed Nov. 5, 2024 (Year: 2024).*

(Continued)

*Primary Examiner* — Nader Bolourchi
(74) *Attorney, Agent, or Firm* — Carlson, Gaskey & Olds, P.C.

(57) ABSTRACT

A control panel for a fire alarm system includes a microprocessor operable to send and receive data. The microprocessor has a serial peripheral interface with a master port and a slave port. A computing device has a Differential Manchester encoder configured to encode data received from the master port and a Differential Manchester decoder configured to decode frames and send the decoded data to the slave port. A method of sending and receiving data is also disclosed.

15 Claims, 5 Drawing Sheets

(51) Int. Cl.
*H04L 25/49* (2006.01)
*H04L 67/12* (2022.01)
*G08B 17/00* (2006.01)

(56) References Cited

U.S. PATENT DOCUMENTS

| | | | |
|---|---|---|---|
| 5,361,261 | A | 11/1994 | Edem et al. |
| 5,408,497 | A | 4/1995 | Baumann et al. |
| 5,579,336 | A * | 11/1996 | Fitzgerald ............... H04B 1/586 |
| | | | 375/220 |
| 5,592,509 | A * | 1/1997 | McClear ............. H04L 25/0292 |
| | | | 375/211 |
| 5,687,356 | A | 11/1997 | Basso et al. |
| 5,696,800 | A | 12/1997 | Berger |
| 6,064,705 | A | 5/2000 | Zalud et al. |
| 6,377,640 | B2 | 4/2002 | Trans |
| 6,473,469 | B1 | 10/2002 | Leitch |
| 7,133,648 | B1 * | 11/2006 | Robinson ............... H04B 10/43 |
| | | | 370/286 |
| 7,535,687 | B2 | 5/2009 | Costa |
| 8,428,195 | B2 | 4/2013 | Ahmed et al. |
| 9,130,746 | B1 | 9/2015 | Lo |
| 9,448,959 | B2 | 9/2016 | Hooper et al. |
| 9,489,814 | B1 * | 11/2016 | Pettigrew ................ H04L 12/40 |
| 10,636,431 | B2 * | 4/2020 | Lesso ..................... H04L 25/49 |
| 2010/0260201 | A1 | 10/2010 | Yu et al. |
| 2012/0201326 | A1 | 8/2012 | Burns et al. |
| 2013/0195153 | A1 * | 8/2013 | Pimentel ............... H04L 5/1492 |
| | | | 375/219 |
| 2019/0268453 | A1 | 8/2019 | Yu et al. |

FOREIGN PATENT DOCUMENTS

| | | |
|---|---|---|
| EP | 3565201 | 11/2019 |
| WO | 2019101776 A1 | 5/2019 |

OTHER PUBLICATIONS

"Fire Alarm Cable—2 Conductor—16 AWG—Solid—Unshielded—PVC—RED—500 FT | West Penn Part 990", Show Me Cable, Online <https://www.showmecables.com>, printed Nov. 5, 2024 (Year: 2024).*
ANSI/TIA-568-C.Feb. 2009, "Balanced Twisted-Pair Telecommunications Cabling and Components Standard", Aug. 2009 (Year: 2009).*
International Preliminary Report on Patentability for International Patent Application No. PCT/US2020/052155 dated Apr. 7, 2022.
International Search Report and Written Opinion for International Patent Application No. PCT/US2020/052155 dated Dec. 2, 20202.
Anonymous, "Serial Peripheral Interface Bus", Internet Citation, Aug. 19, 2011, pp. 1-11. Retrieved from https://en.wikipedia.org/w/index.php?title-Serial_Peripheral_Interface_Bus&oldid=447361990 on Mar. 2, 20224.

* cited by examiner

SYSTEM AND METHOD FOR SENDING AND RECEIVING AN ETHERNET FRAME

CROSS-REFERENCE TO RELATED APPLICATIONS

This application claims the benefit of U.S. Provisional Application No. 62/905,030, filed Sep. 24, 2019, the disclosure of which is incorporated by reference herein in its entirety.

BACKGROUND

Buildings, such as residential buildings and commercial buildings, include various systems, such as fire alarm systems, security systems, climate control systems, etc. These systems include centralized control panels that communicate with other parts of the system, such as sensors, computing devices, occupant interfaces, and others. In some cases, the centralized control panels communicate with these system components via a wired connection.

SUMMARY

A control panel for a fire alarm system according to an exemplary embodiment of this disclosure, among other possible things includes a microprocessor operable to send and receive data. The microprocessor has a serial peripheral interface with a master port and a slave port. A computing device has a Differential Manchester encoder configured to encode data received from the master port and a Differential Manchester decoder configured to decode data and send the decoded data to the slave port.

In a further examples of the foregoing, a wire is connected to the control panel for carrying the data.

In a further examples of any of the foregoing, the wire is a twisted pair wire.

In a further examples of any of the foregoing, the microprocessor is operable to send and receive data to and from the wire via a PHY (physical layer) port.

In a further examples of any of the foregoing, the PHY port is an MII (media independent interface) port.

In a further examples of any of the foregoing, the computing device is an FPGA (field programmable gate array).

In a further examples of any of the foregoing, the FPGA is programmed to perform Differential Manchester encoding and Differential Manchester decoding.

In a further examples of any of the foregoing, a wire is connected to the control panel for carrying the data and a transceiver is configured to enable communication over the wire at rates of at least 1 Mbps.

In a further examples of any of the foregoing, a wire is connected to the control panel for carrying the data. The FPGA is programmed to act as a transceiver that enables communication over the wire at rates of at least 1 Mbps.

In a further examples of any of the foregoing, the data is in the form of an Ethernet frame.

In a further examples of any of the foregoing, the control panel is operable to send and receive data at a rate of 2 Mbps.

A method of sending and receiving data according to an exemplary embodiment of this disclosure, among other possible things includes receiving data in the form of an Ethernet frame at a serial peripheral interface, holding a low select signal at a master port for the duration of the Ethernet frame, such that the serial peripheral interface is configured to act as a master, encoding the Ethernet frame by Differential Manchester encoding, and sending the encoded Ethernet frame to a wire.

In a further example of the foregoing, encoding the Ethernet frame includes adding an overhead, and the overhead includes a preamble, a start of frame (SOF) signal, and an end of frame (EOF) signal.

In a further example of any of the foregoing, the SOF signal is the first zero after the preamble.

In a further example of any of the foregoing, the method includes decoding the encoded Ethernet frame by Differential Manchester decoding.

In a further example of any of the foregoing, the decoding is at a first control panel and the encoding is at a second control panel.

In a further example of any of the foregoing, the decoded Ethernet frame is sent to a slave port of the serial peripheral interface, and holding a low select signal at the slave port for the duration of the Ethernet frame such that the serial peripheral interface is configured to act as a slave.

In a further example of any of the foregoing, a decoded Ethernet frame is sent to the wire.

In a further example of any of the foregoing, the method includes determining whether any data is received at the serial peripheral interface.

In a further example of any of the foregoing, an 8-bit acknowledgement byte is sent when no data is received at the serial peripheral interface.

DETAILED DESCRIPTION

Figure 1:
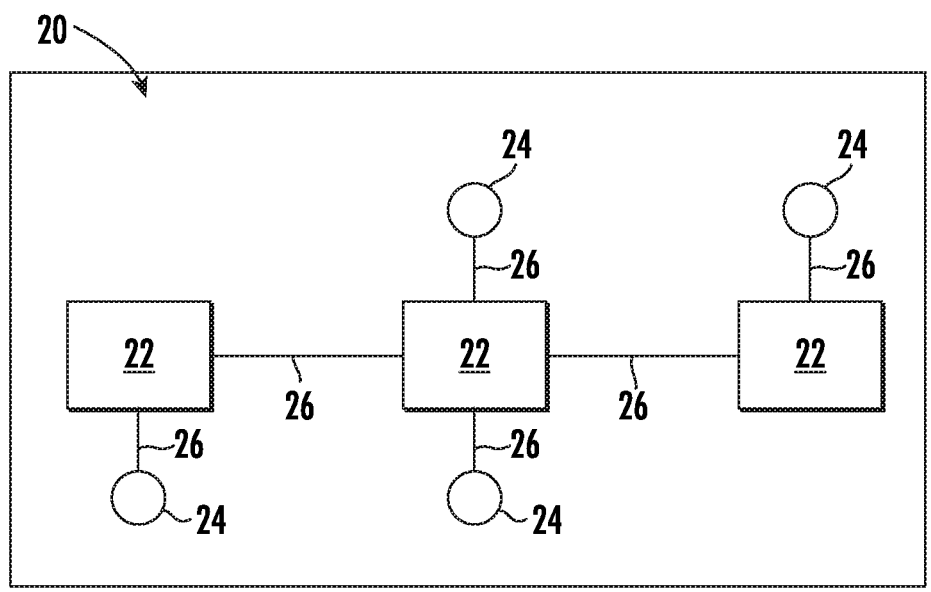
FIG. 1 schematically shows an example fire alarm system for a building.

FIG. 1 schematically shows an example fire alarm system 20 for a building, such as a residential or commercial building (an office building, warehouse, etc.). The fire alarm system includes two or more control panels 22, which are operable to communicate with various system components 24 and with one another. System components 24 can include sensors, computing devices, interfaces (for example, notification devices, pull stations, etc.), or other known components of a fire alarm system. The control panels 22 communicate with one another and with the system components 24 via wires 26. In one example, the wires 26 are operable to handle Ethernet communications or signals, though other protocols are contemplated, by way of example, the Ethernet frames can be layer 2 802.3 Ethernet frames. For example, the control panels 22 can communicate audio signals to be broadcasted at the interfaces 24 or at other control panels 22 in the event of a fire emergency.

The wires 26 can include any type of wired connection suitable for Ethernet communication, such as twisted pair wires. In a more particular example, the wires 26 are 18 AWG twisted pair wires. Although shorter runs are possible the wired connections that connect the control panels 22 and/or system components 24 can be on the order of thousands of feet, depending on building size.

Certain signals, such as audio signals, require communicating relatively large amounts of data at relatively high speeds across the wires 26. For example, for 5,000 feet of 18 AWG twisted pair wires, about 2 Mbps of data communication enables the functions of the fire alarm system 20, with the average data rate in either direction being about 1 Mbps.

Figure 2:
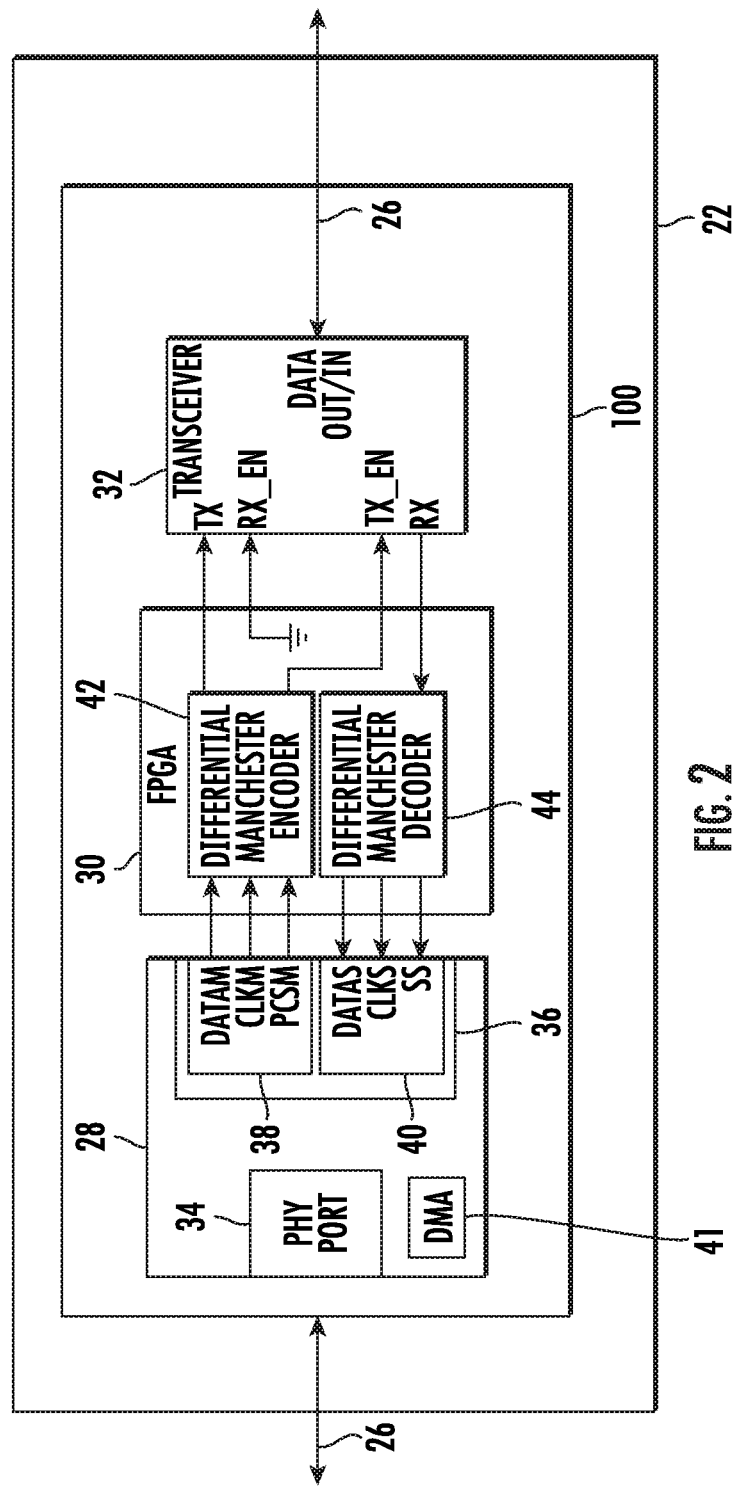
FIG. 2 schematically shows a control panel of the fire alarm system.

FIG. 2 schematically shows a control panel 22 with a CPU 100. In the example shown, the control panel 22 includes one CPU 100, but in other examples, the control panel 22 can include more CPUs 100. The CPU 100 includes a microcontroller 28, a computing device such as an FPGA (field programmable gate array) 30, and a bidirectional transceiver 32. The transceiver 32 can be any known transceiver that enables communication over twisted pair wires 26 at rates of at least 1 Mbps. For instance, the transceiver 32 may include an equalization feature that increases the signaling rate and extends the length of wires 26 over which the transceiver 32 is operable to send/receive signals. Equalization features are generally known in the art. In general, the equalization feature is operable to reverse distortion incurred in a signal transmitted through the transceiver, which increases the signaling rate capability of the transceiver. The transceiver 32 is operable to function in a transmit mode and a receive mode. A signal (TX_EN, discussed in detail below) switches the transceiver 32 between the two modes. By way of example, the transceiver 32 is a transceiver from the RX-485 Series (Texas Instruments). The transceiver 32 can be external from the FPGA 30, as shown in FIG. 2, but in some examples, the FPGA 30 is programmed to perform the functions of the transceiver 32, e.g, the transceiver 32 is part of the FPGA 30. Likewise, CPU 100 is shown to include a microcontroller 28, a computing device 30, and a bidirectional transceiver 32, but two or more of these components may be combined in a chip programmed to perform the functions of the described components, or the functions described herein as being performed by a single component may be distributed amongst multiple components, and/or may be performed across several CPUs.

The microcontroller 28 includes a PHY (physical layer) port 34 that sends and receives Ethernet frames to/from the wires 26. In one example, the port 34 receives the Ethernet frames via an interface (not shown), such as an MII (media independent interface). In a more particular example, the port 34 receives Ethernet frames over a 4 bit, 25 Mbps connection. The microcontroller 28 is operable to receive variable size SPI (serial peripheral interface) signals from the port 34 and send variable size SPI signals to the FPGA 30 via an SPI interface 36. The SPI interface 36 includes a master port 38 and a slave port 40. The master/slave ports 38, 40 allow two-way communication between the microcontroller 28 and FPGA 30. Each port 38, 40 includes a data pin (DATAM or DATAS), and a clock pin (CLKM or CLKS). The master port 38 includes a select signal (PCSM), while the slave port 40 includes a slave chip select (SS). When the select signal is an input, the SPI interface 36 is acting as a slave. When the SPI interface 36 controls (sends) a select signal, the SPI interface 36 is acting as a master.

Figure 3:
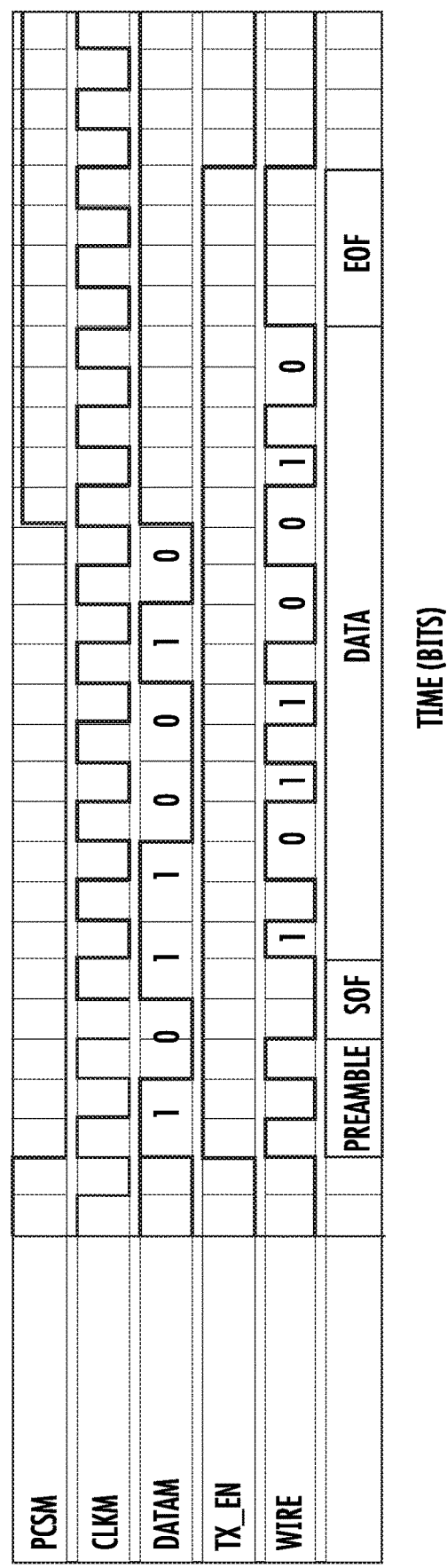
FIG. 3 shows signal timing of transmission of signals in the control panel when a microcontroller of the control panel is in a master state.

FIG. 3 shows the signal timing for the master port 38 when it is sending data from an Ethernet frames to the FPGA 30, meaning the SPI interface 36 is acting as the master. The PCSM (select signal) is held low for the duration of the Ethernet frames. Data is clocked to the FPGA 30 on the falling (high-to-low) edge of the clock (CLKM) signal. As the data is received, a TX_EN (transmit select) signal of the transceiver 32 is held high, putting the transceiver 32 in the transmit mode. Though the TX_EN signal is the primary mode selection signal for the transceiver 32, the transceiver 32 also has an RX_EN signal (shown in FIG. 2), which acts as a receive select signal, and is held low while the transceiver 32 is in transmit mode. The data clocked to the FPGA 30 is transmitted to the transceiver 32 at the TX (transmit) signal, and then to the wire 26. In one example, the data in the Ethernet frames is sent via the master port 38 using a DMA (Direct Memory Access) 41 in the microcontroller 28. The DMA 41 can minimize the loading of the microcontroller 28 as would be known in the art.

The FPGA 30 includes a Differential Manchester Encoder (DME) 42 which is operable to receive the data from the master port 38 and encode it. In some examples, the DME 42 is a hardware element of the FPGA 30. In other examples, the FPGA 30 is programmed to have the capabilities of the DME 42. In other words, in this example, the DME 42 is part of the FPGA 30.

When the FPGA 30 is receiving data from the master port 38, the master port 38 clocks the data discussed above into the DME 42. The DME 42 is operable to encode the data from the master port 38 into a Differential Manchester format, as would be known in the art. The DME 42 also adds a preamble and a "start of frame" (SOF) signal in front of the data and an "end of frame" (EOF) signal after the last data bit, as shown in FIG. 3. This preamble, SOF, and EOF are known as the "overhead" (e.g., non-data bits) for the data being sent in the Ethernet frames. For instance, the preamble consists of toggling the line for 1.5 bits, the SOF is the first zero after the preamble, and the EOF consists of holding the line steady for 2 bits, for a total overhead size of 4.5 bits, though it should be understood other frame sizes could be used. The DME 44 is operable to transmit the encoded data to the transceiver 32, which in turn transmits the data to the wires 26.

Figure 4:
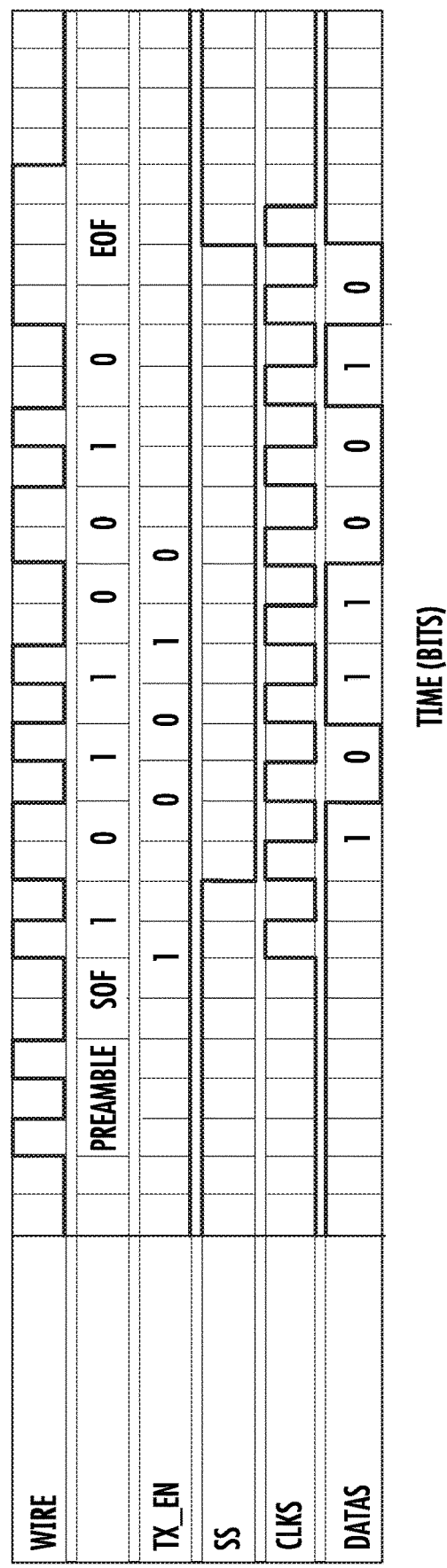
FIG. 4 shows signal timing of transmission of signals in the control panel when a microcontroller of the control panel is in a slave state.

FIG. 4 shows the signal timing for the slave port 40 when it is receiving data from the FPGA 30. As shown in FIG. 4, the TX_EN signal is held low (and the RX_EN signal, shown in FIG. 2, is held high) so that the transceiver 32 is in the receive mode. The slave chip select (SS) signal of the slave port 40 is also held low for the duration of the Ethernet frame. The Ethernet frame is received in the transceiver 32 and then is clocked to the FPGA 30 as the RX (receive) signal of the transceiver 32 (shown in FIG. 2). Again, the data is clocked from the FPGA 30 to the SPI interface 36 on the falling (high-to-low) edge of the clock (CLKS) signal.

The FGPA 30 also includes a Differential Manchester Decoder (DMD) 44. Like the DME 42, in some examples, the DMD 44 is a hardware element of the FPGA 30. In other examples, the FPGA 30 is programmed to have the capabilities of the DMD 44. In other words, in this example, the DMD 44 is part of the FPGA 30. The DMD 44 is operable to receive Differential-Manchester-encoded signals in the wire 26 via the transceiver 32, decode the signals, and transmit them to the slave port 40 as shown in FIG. 4. The DMD 44 is programmed to recognize the preamble and SOF, discussed above, and is programmed to drive the slave select signal (SS) down after the SOF and hold it low for the duration of the signal. The data is then clocked into the slave port 40, again on the falling edge of the clock (CLKS) signal. The DMD 44 is also programmed to detect the EOF and drive the slave select signal (SS) high upon detection of the EOF. In one example, the DMA 41 can be used to receive the data. As discussed above, the DMA 41 can minimize the loading of the microcontroller 28 as it receives data, as would be known in the art. The microcontroller 28 then sends the signal to the wires 26 via the port 34.

The efficiency of transmission of the Ethernet frame over the wire 26 is highly efficient as compared to prior art systems. Efficiency is inversely proportional to the size of the frame. A frame includes the data to be transmitted as well as an overhead, as discussed above. Transmission efficiency is represented as (data size)/(data size+overhead size). For instance, an Ethernet frame that is 2048 bits long and has a frame of 4.5 bits is transmitted by the system discussed above with an efficiency of 99.8%. Layer 2 802.3 Ethernet frames of the same length have a frame of 160 bits, meaning the efficiency of transmission is 92.8%. Accordingly, overhead size is inversely proportional to transmission efficiency, and a smaller overhead size allows for higher transmission efficiency for a given set of data.

Transmission with the system discussed above also enables higher bit rates as compared to prior art system. In particular, twisted pair wires are net capacitive, meaning a string of consecutive ones or zeroes causes capacitance to charge, or build up, in the wire such that when a signal of opposite polarity is encountered, the wires may not be able to discharge the capacitance in time to switch the state. Differential Manchester encoding guarantees a state change (transition) at least once every bit. Therefore, the amount of time the capacitance of the wires can charge is limited to a single bit. This in turn enables higher bit rates of transmission across the wires 26.

Accordingly, the above-described features of the microcontroller 28 and FPGA 30 enable communication rates of 1 Mbps in each direction over the wires 26 (2 Mbps total, since the data path is shared). The features include the relatively small frame size for the Ethernet signals, which enables high transmission efficiency. Additionally, the use of Differential Manchester encoding/decoding prevents the building up capacitance in the wires 26.

Figure 5A:
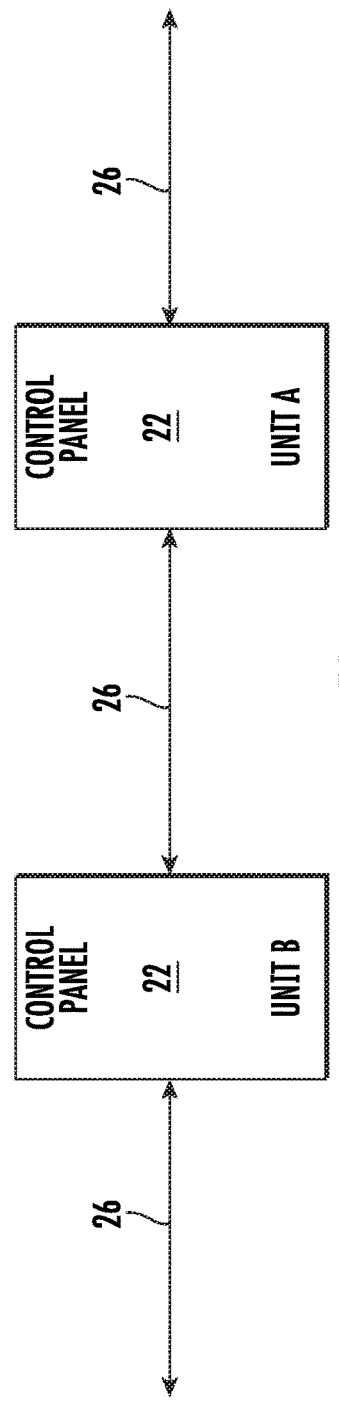
FIG. 5A schematically shows first and second control panels communicating with one another.
Figure 5B:
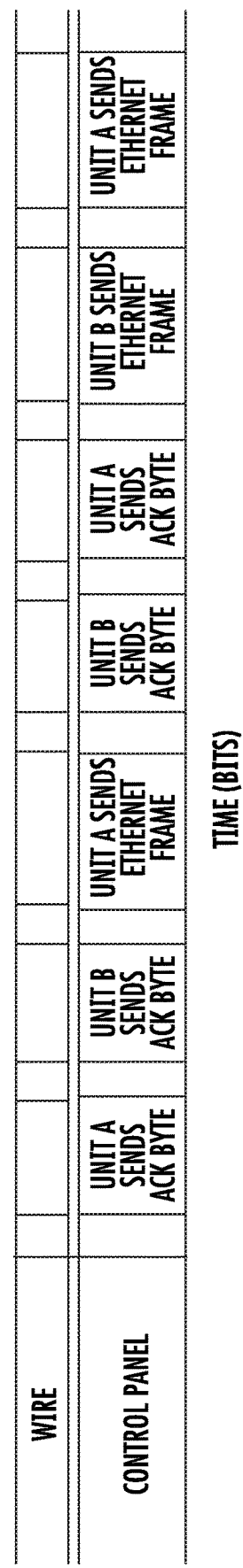
FIG. 5B shows signal timing of the communication of FIG. 5A.

FIGS. 5A-B show two control panels 22 ("Unit A" and "Unit B") communicating Ethernet frames with one another via wires 26 as discussed above. The control panels 22 are programmed to perform line arbitration, e.g., to prevent control panels 22 from sending signals to each other at the same time so that signal collisions are avoided. The programming can be implemented on the CPU 100, or more particularly, in the FPGA 30. Alternatively, the programming can be implemented on another computing device within the control panel 22.

Each of the control panels 22 are operable to determine whether it has any data to send. Ethernet frames typically consist of 512-12176 bits. An 8-bit acknowledgement byte ("ack byte") is sent from a control panel 22 when the control panel 22 does not have any Ethernet frames to send (e.g., the control panel 22 did not receive any data at the port 34), meaning the control panel 22 can receive Ethernet frames from other control panels 22. When a control panel 22 receives an acknowledgement signal and does not have any Ethernet frames to send, it returns an acknowledgement signal, as shown in FIG. 5B. In this way, signal collisions are avoided.

In one example, the microcontroller 28, FPGA 30, and transceiver 32 are included in a single unit, such as the CPU 100, that can be retrofitted in a control panel 22 of an existing (legacy) fire alarm system in a building. In another example, the microcontroller 28, FPGA 30, and transceiver 32 are part of the control panel 22.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A control panel for a fire alarm system, comprising:
a microcontroller operable to send and receive data in a form of Ethernet frames, the microcontroller including a physical layer port and a serial peripheral interface;
a FPGA (field programmable gate array), wherein the microcontroller is operable to receive variable size serial peripheral interface (SPI) signals including the data from the physical layer port and send variable size SPI signals to the FPGA via the serial peripheral interface which includes a master port and a slave port;
wherein the FPGA has a Differential Manchester encoder configured to encode data received from the master port of the serial peripheral interface and a Differential Manchester decoder;
a transceiver that receives encoded data from the FPGA, and wherein the Differential Manchester decoder is operable to:
receive Differential-Manchester-encoded signals via the transceiver;
decode encoded signals; and
transmit decoded signals to the slave port;
a wire connected to the control panel for carrying the data and wherein the transceiver is configured to enable communication over the wire; and
wherein the microcontroller and FPGA are operable to send and receive data at a rate of 1 Mbps over the wire in each direction for a rate of 2 Mbps total as a shared data path.

2. The control panel of claim 1, wherein the wire is a twisted pair wire.

3. The control panel of claim 1, wherein the microcontroller is operable to send and receive the data to and from the wire via the physical layer port.

4. The control panel of claim 3, wherein the physical layer port is an MII (media independent interface) port.

5. The control panel of claim 1, wherein the FPGA is programmed to perform Differential Manchester encoding and Differential Manchester decoding.

6. The control panel of claim 1, wherein the transceiver is configured to enable communication over the wire at rates of at least 1 Mbps.

7. The control panel of claim 1, wherein the master port and the slave port allow two-way communication between the microcontroller and FPGA.

8. The control panel of claim 7, wherein each of the master port and the slave port includes a data pin and a clock pin.

9. The control panel of claim 8, wherein the master port includes a select signal and the slave port includes a slave chip select, and when the select signal is an input, the serial peripheral interface is acting as a slave, and when the serial peripheral interface sends a select signal, the serial peripheral interface is acting as a master.

10. The control panel of claim 9, wherein when the master port sends data from Ethernet frames to the FPGA such that the serial peripheral interface is acting as the master, the select signal is held low for a duration of the Ethernet frames.

11. The control panel of claim 10, wherein the wire comprises a twisted pair wire connected to the control panel for carrying the data and wherein the transceiver is configured to enable communication over the twisted pair wire at rates of at least 1 Mbps, and wherein data is clocked to the FPGA on a falling, high-to-low edge of a clock pin signal, and as the data is received, a transmit select signal of the transceiver is held high, putting the transceiver in a transmit mode.

12. The control panel of claim 11, wherein the transceiver includes a receive select signal that is held low while the transceiver is in transmit mode.

13. The control panel of claim 12, wherein the data in the Ethernet frames is sent via the master port using a Direct Memory Access in the microcontroller.

14. The control panel of claim 12, wherein when the slave port receives data from the FPGA, the transmit select signal is held low and the receive select signal is held high so that the transceiver is in receive mode.

15. The control panel of claim 14, wherein a slave chip select signal of the slave port is held low for a duration of the Ethernet frames, and the Ethernet frames is received in the transceiver and then is clocked to the FPGA as a receive signal of the transceiver, and the data is clocked from the FPGA to the serial peripheral interface on falling, high-to-low edge of a clock signal.

\* \* \* \* \*